Patented Feb. 7, 1939

2,146,306

UNITED STATES PATENT OFFICE 2,146,306

TREATMENT OF POLYMERIC SYNTHETIC RESINS

Barnard M. Marks, Clifton, N. J., assignor to E. I. du Pont de Nemours & Company, Wilmington, Del., a corporation of Delaware No Drawing. Application August 14, 1937, Serial No. 159,096

5 Claims. (Cl. 18—55)

This invention relates to polymeric synthetic resins and, more particularly, to a method of cutting such resins which are depolymerizable by heat.

A body of resin of the type herein considered, which body may be formed in numerous ways, frequently has to be cut. For example, the sprues have to be sawed or clipped off injection molded articles; the resins in massive form, such as the so-called "cast" resins, often are subjected to one or more cutting operations. Heretofore, such resins have been simply sawed, sliced, carved, engraved, clipped, or cut in other manner by purely mechanical means. Such operations invariably leave tool marks on the cut sufaces and, in many instances, this necessitates a buffing operation to eliminate such marks as far as possible.

An object of the present invention is to provide a new and improved method of cutting polymeric synthetic resins. A further object is to provide a method whereby the cut surface will be left polished and not uneven. Other objects of the invention will be apparent from the description given hereinafter.

The above objects are accomplished according to the present invention by cutting a body of solid polymeric synthetic resin which is subject to depolymerization by heat with formation of decomposition products gaseous at the temperature of said decomposition, by contacting therewith a metal tool heated to a temperature at least as high as the decomposition temperature of the resin. Preferably, the present invention is carried out by the direct application to the resin body of a metal tool heated to a temperature substantially above the depolymerization temperature of said resin whereby substantially immediate depolymerization of the resin is effected, and moving said tool along the path to be cut.

The invention resides primarily in the unexpected discovery that the application of a heated metal tool to a body of resin depolymerizable by heat into gaseous decomposition products, will effect such depolymerization so rapidly in the area immediately contacting the tool that charring or discoloration of the rest of the resin does not occur, not even on the fresh surface thus exposed, and the fresh surface is left smooth and glossy without a trace of tool marks.

It will be apparent to those skilled in the art that the tools used for various specific cutting operations will vary widely. A wire heated by an electric current is well adapted for straight cutting such as heretofore had been done with a knife or saw. Thus, a rod of polymerized methyl methacrylate is cut through simply by resting it on a metallic wire maintained at red heat, the cut being substantially equal in width to the diameter of the wire. To reduce cooling of the wire by local abstraction of heat, it is advantageous to move the rod back and forth with respect to the wire during the cutting operation. No appreciable pressure is required.

The above procedure is also advantageous in cutting off the sprues on injection molded articles, the cut surface being left smooth and glossy and free from any trace of charring or discoloration.

An endless metallic wire or ribbon, electrically heated and kept under tension and in continuous linear motion in the manner of a band saw, can be used for the cutting. A body of resin may be carved or engraved by moving across it under slight pressure a heated metallic tool such as a loop of wire rigid enough to resist distortion under the slight pressure incidental to the operation. Other types of tools, of course, could be employed for this purpose, including the ordinary "pyrography" tool designed for the ornamentation of wood and leather by charring, and ordinarily heated by means of a fuel such as alcohol.

The surface of a body of resin may be marked or ornamented by means of a heated tool similar to the branding iron used for marking cattle. This is particularly useful for marking fabricated articles with a trade-mark or a repetitive decorative motif. The result is different from and superior to that of the known practice of stamping designs into the surface of plastics by pressure alone or by pressure with heat merely sufficient to soften the surface, in that the present method actually removes material whereas the heretofore known practice of stamping merely displaces material and pushes up a ridge on each side of every depression.

It will be understood that the term "cutting" is used herein in its broader sense to include the various machining operations as sawing, slicing, carving, engraving, clipping, chasing, grooving, gouging, bevelling, and the like, and that the present invention is applicable for use in all of these cutting operations. Also, the invention is independent of any specific design of tool or means of heating the tool. Specific design of tools will readily occur to those skilled in the art to accomplish various purposes.

The invention is applicable to the cutting of bodies of solid polymeric synthetic resins which are subject to depolymerization by heat with formation of decomposition products gaseous at the temperature of said depolymerization. Such resins include styrene, esters of methacrylic acid and various interpolymers of these compounds with other polymerizable compounds. In U. S. Patent 2,030,901, patented February 18, 1936, to D. E. Strain, and entitled "Process for depolymerizing alpha-substituted acrylic acid esters" are disclosed numerous esters of alpha-substituted acrylic acids including esters of alpha alkyl substituted, alpha aryl substituted, and alpha aralkyl substituted acids which depolymerize at elevated temperature and are operative in the present invention in this respect.

However, many of these esters disclosed in said Strain patent, excluding methacrylic acid esters, are too soft to find practical use as plastics and hence would not ordinarily be cut.

The polymerized esters of acrylic acid, where they are products reasonably hard at room temperature, are adapted to be cut according to the present invention. These polymeric esters, contrary to polystyrene and the polymerized esters of alpha substituted acrylic acids, do not depolymerize to give the corresponding monomeric ester but give dimers and trimers; however, the decomposition products, while not sufficiently volatile for present purposes right at the lowest temperature at which depolymerization occurs, are volatile enough at temperatures 50 or 100° C. above that temperature and such higher temperatures would normally be employed at any rate in most cutting operations in order to work at a reasonably rapid rate. Thus, these polymeric esters are operable in the present invention even though, due to their characteristic softness, few of them, except in interpolymers, find use in the type of plastics that are subjected to cutting operations.

Solid synthetic resins of the polyvinyl acetal type may also be cut in the manner herein described. The preparation of resins of this type is found in U. S. Patent 2,036,092, granted March 31, 1936, to Morrison and entitled "Vinyl ester resins and process of making same".

The temperature of the heated tool will be chosen chiefly through consideration of the temperature of depolymerization of the resin to be cut and the character of the work to be done. Except where an acrylic acid ester is to be cut, the decomposition products are volatile right at the temperature of decomposition so that this need not influence the temperature of the cutting tool.

If nothing more than a "shallow" engraving is desired, then it may be preferable to have the tool at a temperature at a little above that which will effect immediate depolymerization of the resin in order that it may not work more deeply than is desired; thus, with polymethyl methacrylate, a temperature of 350–375° C. would be useful for such a purpose. For deeper and coarser work, and for parting, it is preferred to use temperatures substantially above the temperature of depolymerization of the resin in question, to accomplish the work more rapidly; thus, for polymethylmethacrylate, a temperature of 500–600° C. will be generally useful, and higher temperatures may be used. The higher the temperature the more rapid will be the action, and the use of too high a temperature may make difficult the obtaining of controlled, uniform results by manual operation, e. g., in freehand carving. Ordinarily, it is immaterial whether the temperature of the heated tool is above that of the ignition temperature of the gaseous products of depolymerization. These gaseous products are very likely not to become ignited at all and, if they do so, no harm is done since they merely burn quietly without causing any charring or ignition of the main body of the resin. It should be understood that the temperature will effect, to some extent, the width of the cut made.

The selection of the shape of the metal tool, whether wire, ribbon, pointed instrument, or stamping tool, will be made with respect to the requirements of any given case. The metal should be one possessing sufficient rigidity at the operating temperature and, if it is to be used in the form of a strip under tension, it must not be easily ductile at the temperature of operation. Metals suitable for use in strip form include "Nichrome", "Chromel", and other high temperature-resistant alloys such as are used by heating elements in electric furnaces.

The presence of plasticizers in a proportion within the ordinary range of plasticizers for solid bodies of resin, usually not more than 10% by weight of the resin, does not interfere with the herein disclosed method of cutting.

An advantage of the present invention is that it provides a method of cutting resin polymers of the type herein described in a simple and rapid manner leaving a smooth and glossy surface instead of the tool marks heretofore encountered. This is an advantageous method of performing practically any operation in the general nature of cutting. A particular advantage of the invention is its use in cutting off the sprues of injection molded articles since this can be done as readily as any other method now known and, at the same time, leaves a smooth surface and thereby avoids either a rasping step or leaving a plainly discernible mark on the injection molded article.

As many apparently widely different embodiments of this invention may be made without departing from the spirit and scope thereof, it is to be understood that the invention is not limited to the specific embodiments thereof except as defined in the appended claims.

I claim:

1. Method of cutting a solid body comprising a polymeric synthetic resin which is subject to depolymerization by heat with formation of decomposition products gaseous at the temperature of said depolymerization, which method comprises bringing said body into direct contact with a metal tool heated to a temperature above the depolymerization temperature of said resin.

2. Method of cutting a solid body comprising a polymeric synthetic resin which is subject to depolymerization by heat with formation of decomposition products gaseous at the temperature of said depolymerization, which method comprises bringing said body into direct contact with a metal tool heated to a temperature at least as high as that required to effect rapid depolymerization of said resin and moving said tool along the path to be cut.

3. Method of cutting a solid body comprising polymerized methyl methacrylate, which comprises bringing said body into direct contact with a metal tool heated to a temperature above the depolymerization temperature of said polymerized methyl methacrylate.

4. Method of cutting a solid body comprising polymerized methyl methacrylate, which comprises bringing said body into direct contact with a metal tool heated to a temperature at least as high as that required to effect rapid depolymerization of said polymerized methyl methacrylate and moving said tool along the path to be cut.

5. Method of cutting a solid body comprising polymerized methyl methacrylate, which comprises bringing said body into direct contact with a metal tool maintained at a temperature of approximately 500–600° C. and moving said tool along the path to be cut.

BARNARD M. MARKS.